Oct. 27, 1964     G. V. JAKEWAY     3,153,806
DRAWER PULLS AND THE LIKE
Filed Nov. 29, 1962
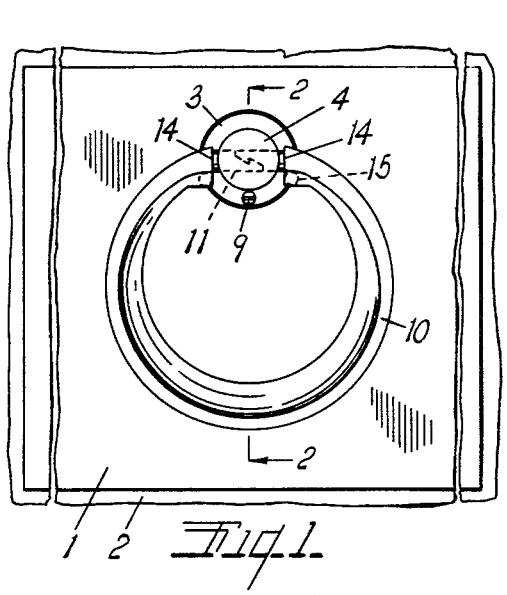
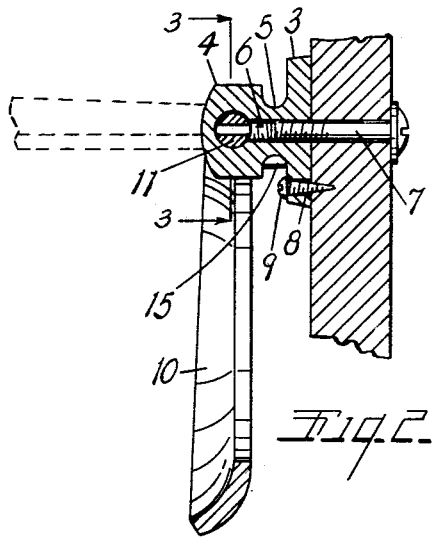
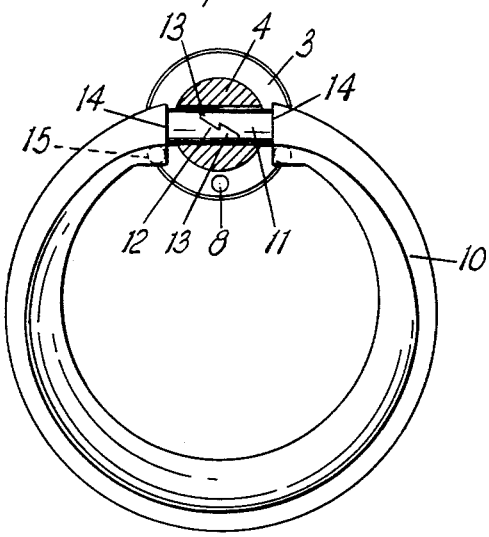
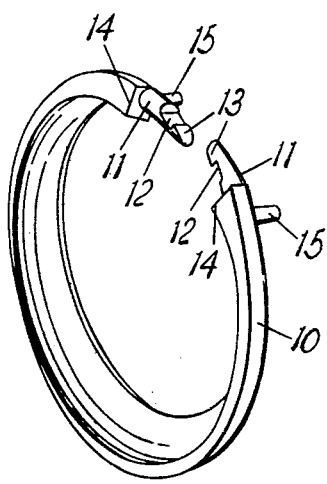
INVENTOR.
Gerald V. Jakeway
BY
AT TORNEY United States Patent Office 3,153,806
Patented Oct. 27, 1964

3,153,806
DRAWER PULLS AND THE LIKE
Gerald V. Jakeway, Grand Rapids, Mich., assignor to Keeler Brass Company, Grand Rapids, Mich., a corporation of Michigan
Filed Nov. 29, 1962, Ser. No. 240,947
6 Claims. (Cl. 16—127)

This invention relates to drawer pulls and the like.

The main objects of this invention are:

First, to provide a drawer pull or the like consisting of two parts, one adjustable relative to the other, which are quickly assembled and remain in assembled relation without the necessity of other connecting parts.

Second, to provide a drawer pull or the like having the above advantage in which the parts may be economically produced in various designs.

Third, to provide a drawer pull or the like in which the pull or load on the handle acts to hold it in its engaged position with the attaching member.

Objects relating to details and economies of the invention will appear from the description to follow. The invention is defined and pointed out in the claims.

A preferred embodiment of the invention is illustrated in the accompanying drawing, in which:

FIG. 1 is a fragmentary front elevational view of a drawer pull embodying my invention illustrated in mounted position upon a drawer which is conventionally illustrated.

FIG. 2 is an enlarged fragmentary view partially in vertical section on a line corresponding to line 2—2 of FIG. 1.

FIG. 3 is an illustration of the drawer pull of my invention partially in section on a line corresponding to line 3—3 of FIG. 2.

FIG. 4 is a perspective view of a handle of the embodiment of my invention illustrated prior to its assembly with the attaching member.

It should be understood that in the accompanying drawings I have illustrated only one design or configuration of the parts and that these are greatly varied and that one of the advantages of this invention is the practicability of such variation in design.

In the accompanying drawing 1 represents the front end of a drawer and 2 a frame, only fragments of which are illustrated. The handle attaching member of the embodiment illustrated comprises a base portion 3 and a head portion 4 connected to the base portion by the reduced neck-like portion 5. The attaching member has an internally threaded bore 6 opening at its inner end to receive an attaching screw 7, the attaching member, in effect, being a nut into which the attaching screw is threaded. To prevent rotary movement of the attaching member on the attaching screw it is provided with a hole 8 receiving the screw 9.

The annular handle 10 is formed of split springable material and terminates at its ends in the complementary pivot members 11 which have complementary tapered overlapping end portions 12 provided with springably engaged interlocking lugs 13. The outer surface of the portions 12 of the pivot members are curved to correspond to the curvature of the portion 11 so that, in effect, when these interlocking parts 12 are in engagement, as illustrated in full lines in FIG. 3 and dotted lines in FIG. 1 a substantially continuous pivot is provided for the handle.

At the outer ends of the pivot portions 11 the handle is provided with shoulder portions 14 which limit the lateral movement of the handle relative to the attaching member. To prevent the attaching members contacting with the surface of the drawer or the like to which it is attached it is provided with stops 15 adjacent the pivot members and positioned to engage the attaching member when the handle is in collapsed position.

It will be understood that commonly in use the handle is grasped to pull out the drawer or other object to which it is attached. It is extended to the horizontal position illustrated in dotted lines in FIG. 2 and the drawer may be pushed back to closed position when the handle is ordinarily released and it swings down to collapsed position the stops preventing it from contacting with the surface of the drawer or other object to which it is attached. With the parts thus formed and arranged they may be very economically produced and may be produced as mountings or castings. The handle may be greatly varied in the matter of shape and dimensions.

The handle is of bendable yieldable material and is initially formed with the pivot members thereof spaced so that their ends may be aligned with the ends of the bore in the head portion 4 of the attaching member and forced together to interlocking position, as illustrated in FIGS. 1, 2 and 3 in which position they are clampingly held. As stated a pull on the handle does not tend to separate the pivot elements but tends to clamp them together.

I have illustrated my invention in a simple and practical commercial embodiment thereof. I have not attempted to illustrate or describe other embodiments or adaptations as it is believed this disclosure will enable those skilled in the art to embody or adapt my invention as may be desired.

Having thus described the invention what is claimed as new and desired to secure by Letters Patent is:

1. A drawer pull or the like comprising an attaching member having a base portion with a centrally disposed internally threaded bore therein adapted to receive an attaching screw and having a hole therein disposed in laterally spaced relation to said bore and adapted to receive an anchoring pin, said attaching member having an integral head portion with a transverse cylindrical bore therethrough, and an annular handle of split springable material terminating at its ends in complementary cylindrical pivot members disposed in said bore, the pivot members having complementary tapered overlapping end portions having springably engaged interlocking lugs, said handle having shoulder-like abutments at the ends of its said pivot members and having inwardly projecting stops engageable with the base portion of said attaching member when the handle is in its collapsed position.

2. A drawer pull or the like comprising an attaching member having a base portion with a centrally disposed internally threaded bore therein adapted to receive an attaching screw and having a hole therein disposed in laterally spaced relation to said bore and adapted to receive an anchoring pin, said attaching member having an integral head portion with a transverse cylindrical bore therethrough, and an annular handle of split springable material terminating at its ends in complementary cylindrical pivot members disposed in said bore, the pivot members having complementary tapered overlapping end portions having springably engaged interlocking lugs, said handle having inwardly projecting stops engageable with the base portion of said attaching member when the handle is in its collapsed position.

3. A drawer pull or the like comprising an attaching member having a base portion with a centrally disposed internally threaded bore therein adapted to receive an attaching screw and having a hole therein disposed in laterally spaced relation to said bore and adapted to receive an anchoring pin, said attaching member having an integral head portion with a transverse cylindrical bore therethrough, and an annular handle of split springable material terminating at its ends in complementary cylindrical pivot members disposed in said bore, the pivot members having complementary tapered overlapping end portions having springably engaged interlocking lugs.

4. A drawer pull or the like comprising an attaching member including a base portion and a head portion having a transverse bore therethrough, and a handle of springable material having integral complementary pivot members engaged in said bore and having overlapping end portions provided with integral interlocking lugs which are held in coacting engagement by the springability of said handle and pull thereon, said handle having attaching member engaging abutments at the outer ends of its pivot members and having laterally projecting stops engageable with said attaching member when the handle is in collapsed position.

5. A drawer pull or the like comprising an attaching member having a transverse bore therethrough, and a handle of springable material having integral complementary pivot members engaged in said bore and having overlapping end portions provided with integral coengaging interlocking lugs which are held in coacting engagement by the springability of said handle and pull thereon, said handle having attaching member engaging abutments at the outer ends of its pivot members.

6. A drawer pull or the like comprising an attaching member having a transverse bore therethrough, and a loop-like handle of split springable material terminating at its ends in oppositely projecting complementary pivot members disposed in said bore, said pivot members having coengaging interlocking portions disposed within said bore and preventing disengagement of said handle from said attaching member as a result of pull thereon.

References Cited in the file of this patent
UNITED STATES PATENTS

| | | |
|---|---|---|
| 404,495 | Nobbs | June 4, 1889 |
| 2,177,554 | Stiff | Oct. 24, 1939 |
| 2,796,627 | Heyer | June 25, 1957 |